United States Patent Office 3,394,142
Patented July 23, 1968

3,394,142
SUBSTITUTED TETRAZOLES AND
PROCESS THEREFOR
Robert J. Koshar, Lincoln Township, Washington County, Minn., assignor to Minnesota Mining and Manufacturing Company, St. Paul, Minn., a corporation of Delaware
No Drawing. Filed Jan. 19, 1966, Ser. No. 522,806
10 Claims. (Cl. 260—308)

This invention relates to a new class of fluorine-containing organic compounds and more particularly to α-difluoraminopolyfluoroalkyltetrazoles, to salts thereof and to a process for the synthesis of these compounds.

It is known that compositions containing nitrogen-fluorine bonds, especially those containing difluoramino (i.e., —$NF_2$) groups, are potent oxidizers which can provide useful energy when combined chemically with fuels such as anhydrous hydrazine, especially when these mixtures are confined in a chamber provided with a nozzle and ignited by means of a spark or flame. Compounds containing the tetrazole ring are known, and certain of these are useful as ingredients of explosives because of their high nitrogen content.

It is an object of this invention to provide a novel and useful class of fluorine-containing heterocyclic oxidants and methods for their synthesis. It is a further object to provide α-difluoraminopolyfluoroalkyltetrazoles and salts thereof, wherein the said alkyl is attached to the ring carbon of the tetrazole. Other objects will become apparent hereinafter.

The novel α-difluoraminopolyfluoroalkyltetrazoles of this invention are represented by the general formula

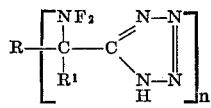

wherein R is a monovalent or divalent radical selected from the group consisting of fluorine, difluoramino, perfluoroalkyl, perfluorocycloalkyl and perfluoroalkylene, $R^1$ is a monovalent radical selected from the group consisting of fluorine, difluoramino, perfluoroalkyl and perfluoroazaalkyl and $n$ equals one or two; when $n$ equals one, R and $R^1$ taken together with the carbon atom to which they are attached form a perfluoroalkylene ring; and the compound contains 2 to 18 carbon atoms.

It is to be understood that when R and $R^1$ contain carbon-carbon linkages the carbon chain may be interrupted by heteroatoms such as oxygen or nitrogen and the carbon chain may be branched and contain electronegative substituents such as chloro, bromo, nitro and difluoramino.

These α-difluoraminopolyfluoroalkyltetrazoles are preferably obtained by the reaction of difluoramino-containing alkyl nitriles of the formula

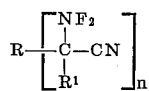

wherein $n$, R and $R^1$ are defined above, with inorganic azides such as for example sodium azide, potassium azide, ammonium azide and aluminum azide in a stirred liquid medium at a temperature of about —20° to 150° C., to form the correspondingly substituted tetrazole as a metal salt. Acidification of the salt yields the corresponding tetrazole which is isolated, e.g., by extraction with an immiscible solvent and removal of the solvent.

The reaction is preferably carried out under autogenous pressure of the nitrile compound and liquid medium using essentially anhydrous conditions. Atmospheric pressure may be used provided that the reaction vessel is equipped with a reflux condenser to prevent the escape of the nitrile used as starting material and the liquid medium. Although stoichiometric amounts of the nitrile compound and inorganic azide are preferably used to attain high yield and to simplify the isolation of the tetrazole and tetrazole salt, an excess of either of the reactants may be used. The reaction is carried out in substantially anhydrous polar liquid solvent such as acetonitrile, dimethylformamide, tetrahydrofuran and the like which dissolve at least a portion of the reactants. These can be termed inert organic solvents, by which is meant that they do not react destructively with the nitrile compound or resultant tetrazole salt.

After completion of the initial reaction, any excess nitrile is vented under reduced pressure. The resulting mixture is then filtered, if necessary, and evaporated to dryness usually at less than 50° C. under reduced pressure yielding the corresponding tetrazole salt. This salt, which may contain some of the solvent used, is dissolved in water, acidified with an inorganic acid such as sulfuric acid or hydrochloric acid and extracted with an immiscible solvent, for example diethyl ether, methylene chloride and the like, and the extract then evaporated to yield the free tetrazole compound. Isolation of the free α-difluoraminopolyfluoroalkyltetrazole in high purity is best accomplished by chromatography such as liquid-solid chromatography, e.g., using silica gel as the solid stationary phase.

The above-mentioned nitrile compounds used as precursors to the tetrazole compounds of this invention can be prepared by methods described in our copending application, Ser. No. 300,956, filed Aug. 5, 1963. For example, perfluoroguanidine, $(F_2N)_2C$=NF, which is obtained by the reaction of nitrogenous compounds, such as ammeline, with elemental fluorine, is reacted under autogenous pressure with a molar excess of HCN in acetonitrile using potassium cyanide as catalyst to yield perfluorocyanoformamidine,

Direct fluorination of the addition product of perfluorocyanoformamidine and ammonia under mild conditions, for example with 10 percent fluorine in nitrogen at —30° C., yields tris(difluoramino)acetonitrile, $(F_2N)_3CCN$, and also bis(difluoramino)fluoroacetonitrile, $(F_2N)_2CFCN$. Likewise, using a somewhat similar procedure, the reaction of HCN with the polyfluoroalkylfluorimino compounds of the formulas $R_fCF$=NF and $(R_f)_2C$=NF wherein $R_f$ is a perfluoroalkyl or perfluorochloroalkyl, using potassium cyanide as a catalyst, yields reaction products such as represented generally by the formulas

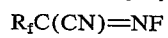

$$R_fC(CN)=NF$$

and $(R_f)_2C(CN)NFH$, respectively. These can be fluorinated directly or in the case of $R_fC(CN)$=NF reacted with ammonia to form addition compounds which are then fluorinated under the abovementioned mild conditions to yield the starting nitrile compounds. Many of the polyfluoroalkylfluorimino compounds described above can be prepared by the method disclosed by R. A. Mitsch, J. Am. Chem. Soc., 87, 328 (1965).

Illustrative compounds of the invention include the following:

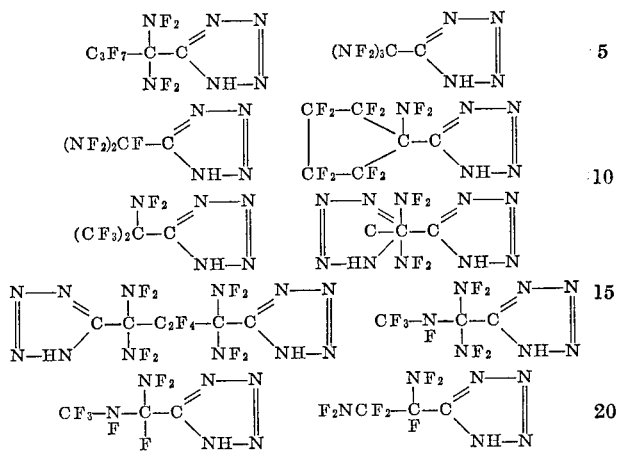

The α-difluoraminopolyfluoroalkyltetrazoles are acidic compounds which are capable of forming a variety of salts. These involve the tetrazole ring moiety. The cationic portion of the salt can be metals such as sodium, potassium, aluminum and other alkali and alkaline earth metals as well as cations derived from inorganic and organic bases. The preparation of these tetrazole salts is accomplished by the above described methods as well as those methods known to the art for preparing salts of 5-substituted tetrazoles. The free tetrazole compounds of this invention have appreciable acidity, their $pK_a$ range generally being between about 1 and 4.

The tetrazole compounds of this invention are oxidants which are especially useful as propellant oxidizers and explosive ingredients. All of the compounds oxidize potassium iodide, for example in a solution of potassium iodide, water and acetonitrile, liberating iodine. Many of the compounds, especially those containing a high content of difluoramino groups such as 5-tris(difluoramino)methyltetrazole, are shock-sensitive and readily release their energy in the form of heat, light and gaseous products when impacted. The tetrazole salts, particularly the dry metal salts, are especially explosive when impacted or sparked.

Since many of the compounds in the above-mentioned process contain a high portion of difluoramino oxidant groups which can react violently with certain reducing agents or explode on impact, especially when highly purified, a suitable barricade, and equipment such as heavy gauntlets and face shield should be provided for the operator during all phases of their synthesis.

The following examples are given for illustrative purposes and are not intended to limit the described invention. The fluorine nuclear magnetic resonance (n.m.r.) values are given as $\phi$ units which are relative to $CFCl_3$ as the internal reference. All parts are by weight unless otherwise specified.

Example 1

A glass reaction vessel containing a polytetrafluoroethylene coated magnetic stirring bar and 0.3 millimole of sodium azide is evacuated, cooled to —110° C. and then charged by means of a vacuum manifold with 1 ml. (liquid at 25° C.) of acetonitrile and 0.3 millimole of tris(difluoramino)acetonitrile. The reactor is closed, allowed to warm to room temperatrue and then stirred at room temperature for two hours and at 50° to 60° C. for one hour. Any unreacted tris(difluoramino)acetonitrile is removed under reduced pressure and the remaining solution is evaporated to give sodium 5-tris(difluoramino)methyltetrazole, a white, ether insoluble, non-volatile, impact sensitive solid having a single fluorine n.m.r. peak centered at about —31.8$\phi$. Its infrared spectrum (Nujol) exhibits strong, broad absorptions in the region between about 10.2 and 11.6 microns due mainly to the NF bonds of the tris(difluoramino)methyl moiety.

Sodium 5-tris(difluoramino)methyltetrazole,

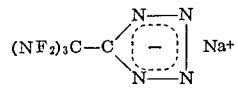

thus prepared is dissolved in 0.15 ml. of water and treated with 0.1 ml. of 37 percent aqueous HCl. The mixture (2 liquid phases) is extracted with diethyl ether. The extracts are combined, dried over anhydrous calcium sulfate and evaporated to yield 5-tris(difluoramino)methyltetrazole,

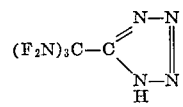

which is a viscous, acidic liquid soluble in ether and having a vapor pressure of less than about 2 mm. Hg at 25° C. Its fluorine n.m.r. spectrum exhibits a peak at about —32.8$\phi$ while its infrared spectrum shows strong absorptions in the region between 10.4 and 11.6 microns.

Example 2

1,2-bis(difluoramino)perfluoroethyl cyanide, $$F_2NCF_2CF(NF_2)CN$$

is prepared in high yield by the reaction of excess tetrafluorohydrazine with perfluoroacrylonitrile under autogenous pressure at about 100° C. The product is isolated by gas-liquid chromatography at 25° C. using a column composed of 20 percent by weight of a silicone rubber (available under the trade name LSX–3–0295), on acid washed diatomaceous silica.

The nitrile is caused is react with potassium azide by the procedure set forth in Example 1. In this way, 5-[1,2-bis-difluoramino)perfluoroethyl]tetrazole,

and the potassium salt of 5-[1,2-bis(difluoramino)perfluoroethyl]tetrazole are obtained.

Example 3

1,1-bis(difluoramino)perfluorobutyl cyanide is prepared by the reaction of perfluoro-1-azapentene-1, $CF_3CF_2CF_2CF=NF$, under anhydrous conditions with a molar excess of HCN at room temperature and under autogenous pressure, using potassium cyanide as catalyst and acetonitrile as a solvent, to yield the intermediate cyanofluorimino compound, $CF_3CF_2CF_2C(CN)=NF$. The cyanofluorimino compound is treated with an equimolar amount of ammonia in diethyl ether under essentially anhydrous conditions at about —60° C. The diethyl ether is removed in vacuo at about —60° C. and the residual ammonia adduct is fluorinated in acetonitrile under mild conditions, using 10 percent elemental fluorine in nitrogen at —13° to 0° C., thus producing the cyanide.

(5[1,1-bis(difluoramino)perfluorobutyl]tetrazole,

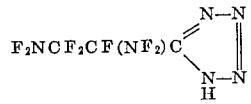

and its sodium salt are prepared from 1,1-bis(difluoramino)perfluorobutyl cyanide and sodium azide, using the procedures described in Example 1.

Example 4

Employing the procedure of Example 1, bis(difluoramino)fluoroacetonitrile, $(F_2N)_2CFCN$, is reacted with sodium azide. 5-[dis(difluoramino)fluoromethyl]tetrazole and the sodium salt of 5-[bis(difluoramino)fluoromethyl]tetrazole are thus produced.

Example 5

Employing the procedure of Example 1, 1,1-bis(difluoramino)perfluoro-2-azapropyl cyanide, $$CF_3NFC(NF_2)_2CN$$

obtained from the fluorimino compound, $$CF_3NFC(NF_2)=NF,$$

a product of the direct fluorination of ammeline, by procedure similar to those described in Example 3, is caused to react with sodium azide to yield 5-[1,1-bis(difluoramino)perfluoro2-azapropyl]tetrazole,

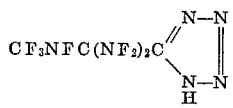

and its sodium salt.

What is claimed is:

1. A compound of the formula

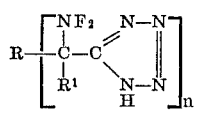

containing 2 to 18 carbon atoms, wherein R is a monovalent or divalent radical selected from fluorine, difluoramino, perfluoroalkyl, perfluorocycloalkyl or perfluoroalkylene, $R^1$ is a fluorine, difluoramino, perfluoroalkyl or perfluoroaza-alkyl radical and $n$ is the number one or two and when $n$ is one, R and $R^1$ when taken together with the carbon atom to which they are attached form a perfluoroalkylene ring; and salts thereof with a metal.

2. The compound according to claim 1, wherein R and $R^1$ are difluoramino groups.

3. The sodium salt of a compound according to claim 2.

4. The compound according to claim 1, wherein R is fluorine and $R^1$ is a difluoraminodifluoromethyl group.

5. The potassium salt of a compound according to claim 4.

6. The compound according to claim 1, wherein $R^1$ is a difluoramino group and R is the perfluoropropyl group.

7. The sodium salt of a compound according to claim 6.

8. The compound according to claim 1, wherein $R^1$ is fluorine and R is a difluoramino group.

9. The sodium salt of a compound according to claim 8.

10. The process for the production of substituted tetrazoles which comprises reacting an azide of the group consisting of sodium azide, potassium azide, ammonium azide, and aluminum azide and a nitrile of the formula

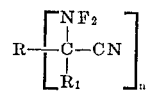

containing 2 to 18 carbon atoms, wherein R is a monovalent or divalent radical selected from fluorine, difluoramino, perfluoroalkyl, perfluorocycloalkyl or perfluoroalkylene, $R^1$ is a fluorine, difluoramino, perfluoroalkyl or perfluoroaza-alkyl radical and $n$ is the number one or two and when $n$ is one, R and $R^1$ when taken together with the carbon atom to which they are attached form a perfluoroalkylene ring.

References Cited

UNITED STATES PATENTS

| | | | |
|---|---|---|---|
| 3,038,900 | 6/1962 | Dess | 260—248 |
| 3,215,709 | 11/1965 | Logothetis | 260—349 |

ALTON D. ROLLINS, *Primary Examiner.*

UNITED STATES PATENT OFFICE
CERTIFICATE OF CORRECTION

Patent No. 3,394,142　　　　　　　　　　　　　　　　　　July 23, 1968

Robert J. Koshar

It is certified that error appears in the above identified patent and that said Letters Patent are hereby corrected as shown below:

Column 3, lines 11 to 14, the right-hand portion of the formula should appear as shown below:

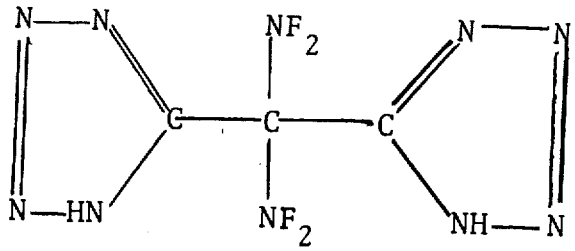

Column 4, line 61, "-13°" should read -- -30° --; line 75, "5-[dis(fluoramino)" should read -- 5-[bis(difluoramino) --.

Signed and sealed this 10th day of February 1970.

(SEAL)
Attest:

EDWARD M. FLETCHER, JR.　　　　　　　　　　WILLIAM E. SCHUYLER, JR.
Attesting Officer　　　　　　　　　　　　　Commissioner of Patents